(12) United States Patent
Yamamoto et al.

(10) Patent No.: US 11,966,237 B2
(45) Date of Patent: Apr. 23, 2024

(54) GIMBAL AND SYSTEM HAVING THE SAME

(71) Applicant: CANON PRECISION INC., Hirosaki (JP)

(72) Inventors: Youhei Yamamoto, Hirosaki (JP); Hiroki Kobayashi, Hirosaki (JP); Seiyo Aizu, Tsugaru (JP)

(73) Assignee: CANON PRECISION INC., Aomori-ken (JP)

( * ) Notice: Subject to any disclaimer, the term of this patent is extended or adjusted under 35 U.S.C. 154(b) by 254 days.

(21) Appl. No.: 17/565,799

(22) Filed: Dec. 30, 2021

(65) Prior Publication Data

US 2022/0308601 A1    Sep. 29, 2022

(30) Foreign Application Priority Data

Mar. 25, 2021    (JP) ................. 2021-051616

(51) Int. Cl.
| | |
|---|---|
| *G05D 3/20* | (2006.01) |
| *F16M 11/12* | (2006.01) |
| *F16M 11/18* | (2006.01) |
| *F16M 13/04* | (2006.01) |
| *G03B 17/56* | (2021.01) |

(52) U.S. Cl.
CPC ............. *G05D 3/20* (2013.01); *F16M 11/123* (2013.01); *F16M 11/18* (2013.01); *F16M 13/04* (2013.01); *F16M 2200/041* (2013.01); *G03B 17/561* (2013.01)

(58) Field of Classification Search
CPC ........ G05D 3/20; F16M 11/123; F16M 11/18; F16M 13/04; F16M 2200/041; F16M 2200/042; F16M 11/105; F16M 11/2064; F16M 13/00; F16M 11/12; G03B 17/561; G03B 17/563; G01D 11/30; G01D 21/02
See application file for complete search history.

(56) References Cited

U.S. PATENT DOCUMENTS

| | | | |
|---|---|---|---|
| 2019/0074751 A1* | 3/2019 | Chen | H02K 11/215 |
| 2019/0113922 A1* | 4/2019 | Koyama | B64D 47/08 |
| 2020/0003357 A1* | 1/2020 | Su | B66C 13/04 |
| 2020/0213518 A1* | 7/2020 | Su | G05D 3/12 |
| 2020/0293046 A1* | 9/2020 | Liu | G05D 1/101 |
| 2021/0165388 A1* | 6/2021 | Wang | G05D 1/0094 |
| 2021/0247667 A1* | 8/2021 | Chu | F16M 11/10 |
| 2022/0011787 A1* | 1/2022 | Liu | F16M 11/18 |

FOREIGN PATENT DOCUMENTS

JP    2017501667 A    1/2017

* cited by examiner

*Primary Examiner* — Abdelaaziz Tissire
(74) *Attorney, Agent, or Firm* — Canon U.S.A., Inc. I.P. Division

(57) ABSTRACT

A gimbal configured to stabilize a supported unit in a predetermined attitude includes an acceleration sensor configured to detect an acceleration of the supported unit, a first calculator configured to calculate attitude information of the supported unit using the acceleration, a rotator including a rotor member rotatable relative to a stator member, an angle detecting sensor configured to detect a rotation angle of the rotator, and a second calculator configured to calculate a correction value for the angle information using the attitude information and the angle information of the rotator based on the rotation angle.

10 Claims, 9 Drawing Sheets

GIMBAL AND SYSTEM HAVING THE SAME

BACKGROUND OF THE INVENTION

Field of the Invention

The present invention relates to a gimbal and a system having the same.

Description of the Related Art

A gimbal generally includes a motor having a stator and a rotor, and an angle detecting sensor that detects a rotation angle of the rotor relative to the stator. Japanese PCT Domestic Publication No. ("JP") 2017-501667 discloses a gimbal having a noncontact type angle detecting sensor that reduces the frictional resistance and improves the controllability.

The gimbal of JP 2017-501667 needs a component that connects the angle detecting sensor to a calibration apparatus, to calibrate the angle detecting sensor, and has difficulty in making small the gimbal.

SUMMARY OF THE INVENTION

The present invention is to provide a small gimbal that can calibrate an angle detecting sensor and a system having the gimbal.

A gimbal according to one aspect of the present invention is configured to stabilize a supported unit in a predetermined attitude. The gimbal includes an acceleration sensor configured to detect an acceleration of the supported unit, a first calculator configured to calculate attitude information of the supported unit using the acceleration, a rotator including a rotor member rotatable relative to a stator member, an angle detecting sensor configured to detect a rotation angle of the rotator, and a second calculator configured to calculate a correction value for the angle information using the attitude information and the angle information of the rotator based on the rotation angle.

A system according to another aspect of the present invention includes the above the gimbal, and a supported unit supported by the gimbal.

Further features of the present invention will become apparent from the following description of exemplary embodiments with reference to the attached drawings.

DESCRIPTION OF THE EMBODIMENTS

Figure 1:
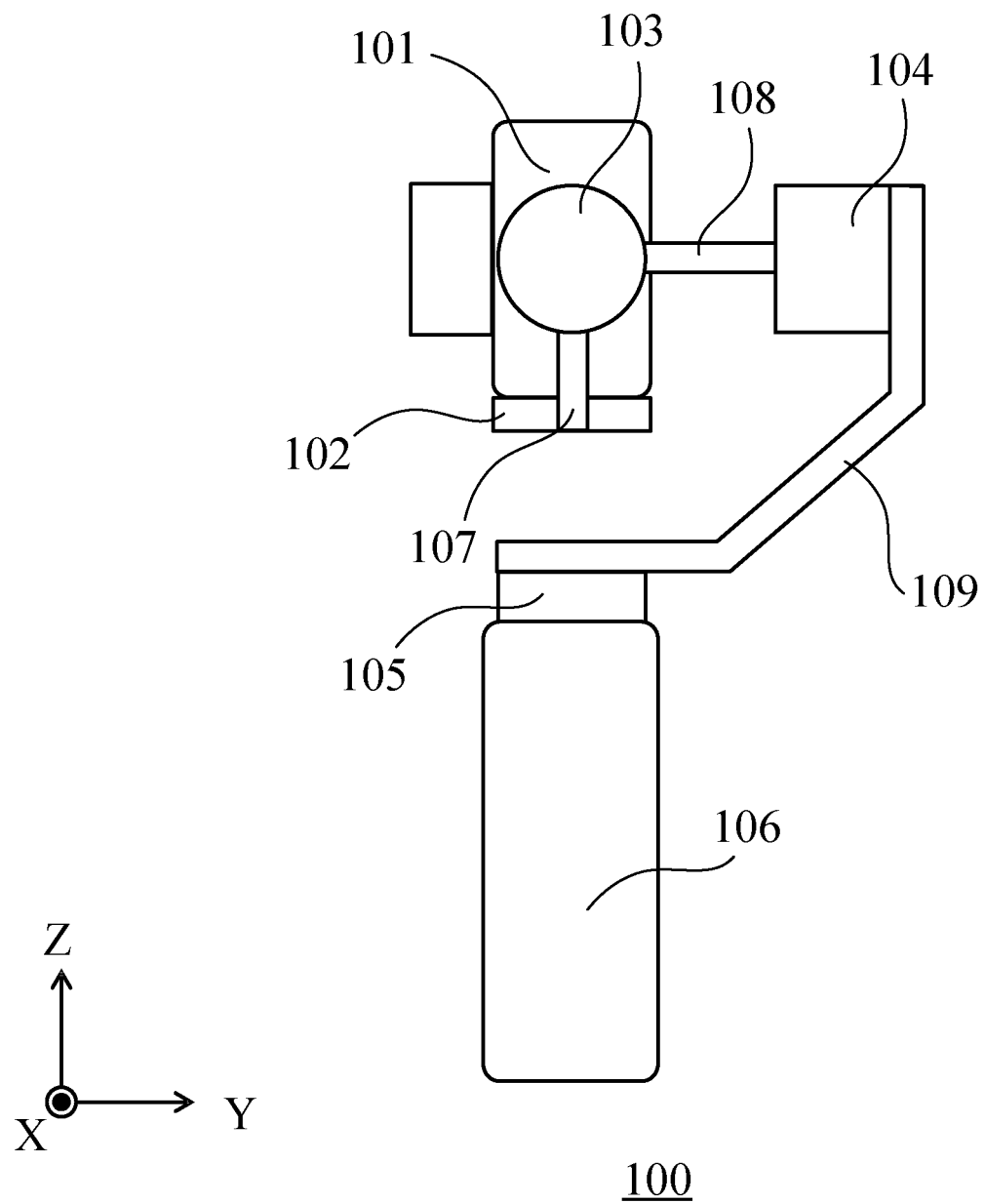
FIG. 1 is a schematic diagram illustrating a configuration of a system having a gimbal according to a first embodiment.

Referring now to the accompanying drawings, a description will be given of embodiments according to the present invention. Corresponding elements in respective figures will be designated by the same reference numerals, and a description thereof will be omitted.

First Embodiment

FIG. 1 is a schematic view illustrating a configuration of a system 100 having the gimbal according to the first embodiment. The system 100 includes a gimbal and a supported unit 101 fixed by the gimbal. The gimbal can stabilize the supported unit 101 in a predetermined attitude. The supported unit 101 may be an image pickup apparatus such as a digital still camera or a digital video camera, or a detection apparatus such as a sensor.

The gimbal includes a support member 102 that supports the supported unit 101. The gimbal includes a first rotation driver 103, a second rotation driver 104, and a third rotation driver 105. The first to third rotation drivers 103, 104, and 105 rotate the supported unit 101 around the X-axis, the Y-axis, and the Z-axis, respectively. The gimbal includes a holder 106 used for a user to hold the gimbal. The gimbal includes a connecting member 107 that connects the support member 102 and the first rotation driver 103 to each other, a connecting member 108 that connects the first rotation driver 103 and the second rotation driver 104 to each other, and a connecting member 109 that connects the second rotation driver 104 and the third rotation driver 105 to each other.

Figure 2:
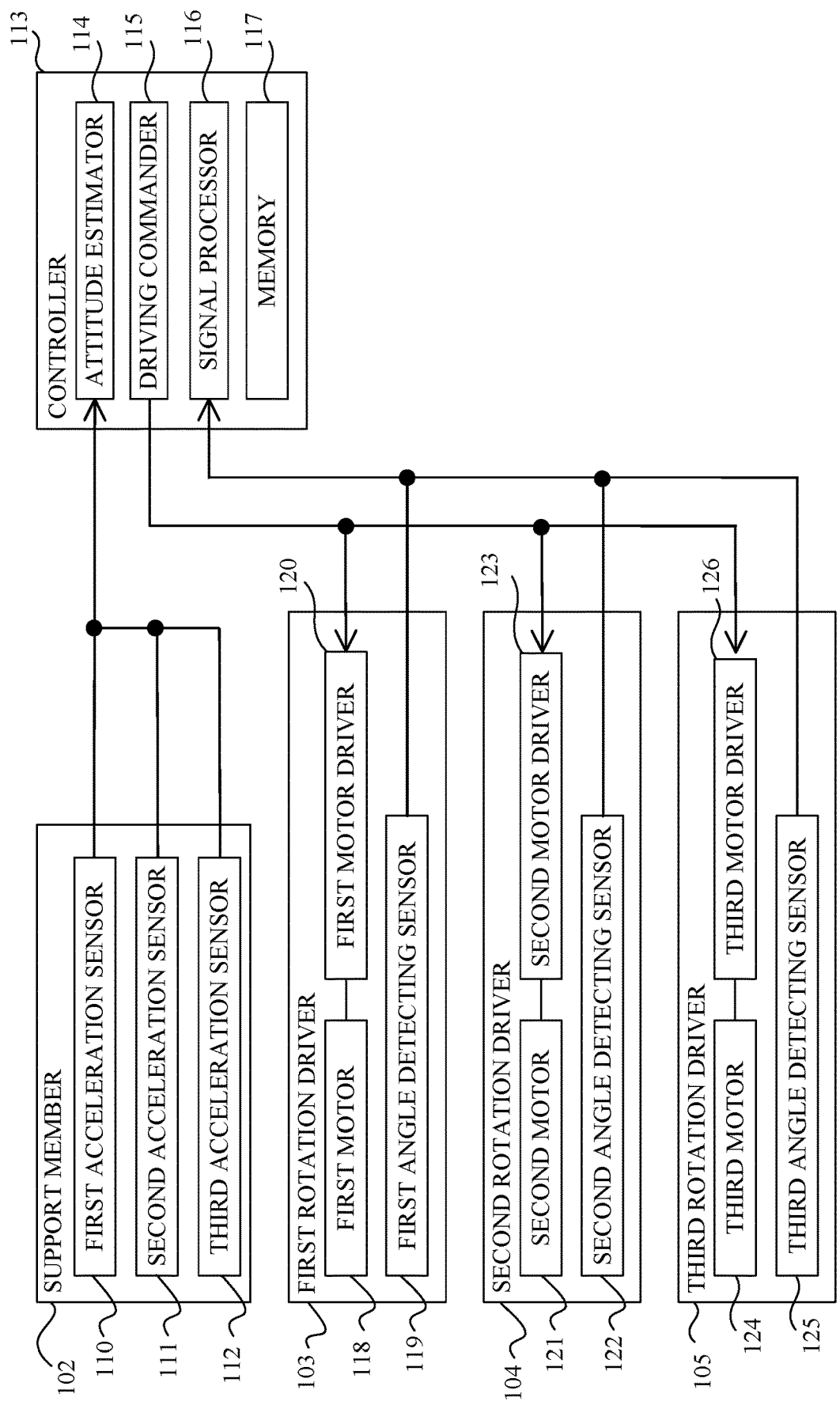
FIG. 2 is a schematic view illustrating a configuration of the gimbal according to the first embodiment.

FIG. 2 is a schematic view illustrating a configuration of the gimbal according to this embodiment. The support member 102 includes a first acceleration sensor 110, a second acceleration sensor 111, and a third acceleration sensor 112. The first to third acceleration sensors 110, 111, and 112 detect the accelerations of the supported unit 101 in the X-axis direction, the Y-axis direction, and the Z-axis direction, respectively. The first to third acceleration sensors 110, 111, and 112 output the detected acceleration to a controller 113.

The first rotation driver 103 includes a first motor 118, a first angle detecting sensor 119, and a first motor driver 120. The second rotation driver 104 includes a second motor 121, a second angle detecting sensor 122, and a second motor driver 123. The third rotation driver 105 includes a third motor 124, a third angle detecting sensor 125, and a third motor driver 126.

The controller 113 includes an attitude estimator (first calculator) 114, a driving commander 115, a signal processor (second calculator) 116, and a memory 117.

The attitude estimator 114 includes elements such as a CPU, a GPU, a DSP, and an A/D conversion element, and circuits such as FPGA and ASIC. The attitude estimator 114 calculates attitude information ($\theta_x$, $\theta_y$, $\theta_z$) of the supported unit 101 expressed by the following expressions (1) to (3) using the accelerations detected by the first to third acceleration sensors 110, 111, and 112. In this embodiment, the attitude information is information on an angle of the supported unit 101 around a rotation axis of the motor.

$$\theta_x = \text{ATAN2}(\alpha z, \alpha y) \quad (1)$$

$$\theta_y = \text{ATAN2}(\alpha z, \alpha x) \quad (2)$$

$$\theta_z = \text{ATAN2}(\alpha y, \alpha x) \quad (3)$$

ATAN2 (X, Y) is an inverse tangent operation function that determines a quadrant and changes a phase from 0 to $2\pi$. $\alpha x$, $\alpha y$, and $\alpha z$ are accelerations of the supported unit 101 in the X-axis direction, the Y-axis direction, and the Z-axis direction, respectively.

The driving commander 115 includes elements such as a CPU, a GPU, a DSP, and an A/D conversion element, and circuits such as FPGA and ASIC. The driving commander 115 calculates a driving amount of the motor so that the supported unit 101 stabilizes in the predetermined attitude, using the attitude information of the supported unit 101 calculated by the attitude estimator 114 and the angle information of the motor (rotator) of each rotation driver calculated by the signal processor 116. The driving commander 115 transmits a driving signal corresponding to the calculated driving amount to each rotation driver. The driving signal is, for example, a pulse signal, a PWM signal, a serial signal, or the like.

The signal processor 116 includes elements such as a CPU, a GPU, a DSP, and an A/D conversion element, and circuits such as FPGA and ASIC. The signal processor 116 calculates angle information ($\varphi_x$, $\varphi_y$, $\varphi_z$) of the motor using the rotation angle of each motor detected by the angle detecting sensor of each rotation driver. The signal processor 116 calculates a correction value for the angle information of the motor using the attitude information of the supported unit 101 calculated by the attitude estimator 114 and the angle information of the motor. The signal processor 116 may execute at least one operation of the attitude estimator 114 and the driving commander 115.

A description will now be given of a concrete calculation method of the correction value for the angle information of the first motor 118 in the first rotation driver 103.

First, the signal processor 116 acquires angle information $\varphi_{xn}$ of the first motor 118 corresponding to the predetermined attitude information $\theta_{xn}$ (n=1, 2, ... N). The attitude information $\theta_{xn}$ and the angle information $\varphi_{xn}$ may be sorted in advance in ascending order of the values.

Next, the signal processor 116 calculates an angle error INL($\varphi_{xn}$) of the angle information $\varphi_{xn}$ of the first motor 118 in the predetermined attitude represented by the following expression (4).

$$\text{INL}(\Phi_{xn}) = \Phi_{xn} - \theta_{xn} \quad (4)$$

The angle error INL($\varphi_x$) corresponding to the angle information $\varphi_x$ is approximated by the following expression (5) by the Fourier series expansion.

$$INL(\Phi_x) = A_{x0} + \sum_{m=1}^{4}(A_{xm}\cos m\Phi_x + B_{xn}\sin m\Phi_x) \quad (5)$$

By obtaining coefficients $A_{x0}$, $A_{xm}$ (m=1, 2, 3, 4) and $B_{xm}$ (m=1, 2, 3, 4), the approximate value of the angle error INL($\varphi_x$) corresponding to the angle information $\varphi_x$ is calculated.

The coefficients $A_{x0}$, $A_{xm}$, and $B_{xm}$ are obtained by the following expressions (6) to (8), respectively.

$$A_{x0} = \frac{1}{N} \times \sum_{i=1}^{N} INL(\Phi_{xi}) \quad (6)$$

$$A_{xm} = \frac{2}{N} \times \sum_{i=1}^{N} INL(\Phi_{xi}) \times \cos(m \times (\theta_{xi} + A_{x0})) \quad (7)$$

$$B_{xm} = \frac{2}{N} \times \sum_{i=1}^{N} INL(\Phi_{xi}) \times \sin(m \times (\theta_{xi} + A_{x0})) \quad (8)$$

The coefficients $A_{x0}$, $A_{xm}$, and $B_{xm}$ are stored in the memory 117 as correction values for the angle information of the first motor 118. In this embodiment, the angle error INL($\varphi_x$) is expressed by a fourth-order approximation expression, but may be expressed by a fifth-order or higher-order approximation expression.

The signal processor 116 can calculate the correction values for the angle information of the second motor 121 in the second rotation driver 104 and the third motor 124 in the third rotation driver 105 by performing similar processing.

The signal processor 116 corrects the motor angle information ($\varphi_x$, $\varphi_y$, $\varphi_z$) using the calculated correction value, and calculates the corrected angle information ($\varphi'_x$, $\varphi'_y$, $\varphi'_z$) of the motor expressed by the following expressions (9) to (11).

$$\Phi'_x = \Phi_x - INL(\Phi_x) \quad (9)$$

$$\Phi'_y = \Phi_y - INL(\Phi_x) \quad (10)$$

$$\Phi'_z = \Phi_z - INL(\Phi_x) \quad (11)$$

In this embodiment, the signal processor 116 serves as a corrector for correcting the angle information, but a corrector may be separate from the signal processor 116.

In order to improve the accuracy of the angle information, the correction value may be calculated and stored multiple times, and the angle information may be corrected multiple times.

The memory 117 includes a storage medium such as a ROM, a RAM, and a hard disk drive. The memory 117 stores the correction value for the angle information of the motor calculated by the signal processor 116. The memory 117 may store a program to be executed by each of the attitude estimator 114, the driving commander 115, and the signal processor 116. The correction value and the program are stored in the nonvolatile storage medium of the memory 117. The memory 117 may include one or more storage media.

Figure 3:
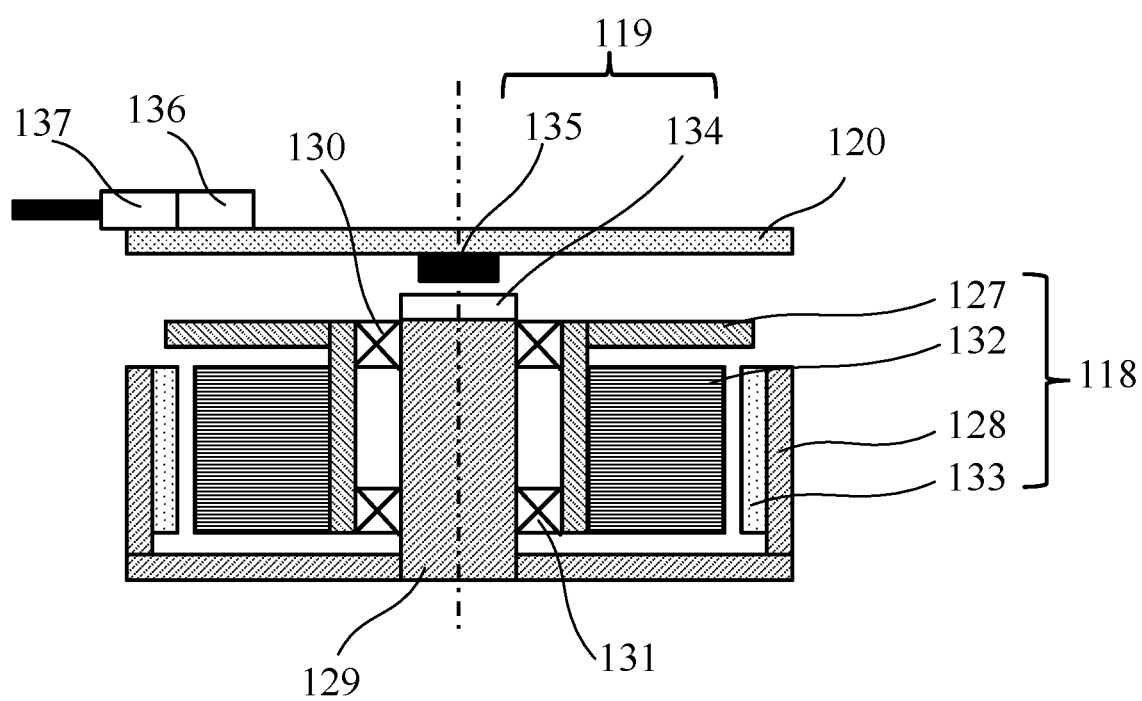
FIG. 3 is a schematic view illustrating a configuration of a first rotation driver according to the first embodiment.

FIG. 3 is a schematic view illustrating the configuration of the first rotation driver 103. Since the configurations of each of the second and third rotation drivers 104 and 105 are the same as the configurations of the first rotation driver 103, a detailed description of the configurations of the second and third rotation drivers 104 and 105 will be omitted in this embodiment.

The first motor 118 includes a stator member 127, a rotor member 128, a rotating shaft 129, upper bearings 130, and lower bearings 131. The upper bearings 130 and the lower bearings 131 are provided on a first end side and a second end side of the rotating shaft 129, respectively. The rotor member 128 is rotatable relative to the stator member 127. In this embodiment, a coil 132 is attached to the stator member 127 and a magnet 133 is attached to the rotor member 128, but the magnet 133 may be attached to the stator member 127 and the coil 132 may be attached to the rotor member 128.

The first angle detecting sensor 119 includes a magnet 134 and a magnetic sensor 135. The magnet 134 has a disk-like shape and is attached to the first end of the rotating shaft 129. The magnetic sensor 135 is disposed at a position opposite to the magnet 134. The first angle detecting sensor 119 is a magnetic encoder (electromagnetic induction encoder) in this embodiment, but the present invention is not limited to this embodiment. The first angle detecting sensor 119 may be an optical encoder or a capacitance type encoder. Although the magnetic sensor 135 is attached to the first motor driver 120 in this embodiment, it does not have to be attached to the first motor driver 120.

The first motor driver 120 includes elements such as a CPU, a GPU, an A/D conversion element, and an FET, and circuits such as FPGA and ASIC. The first motor driver 120 includes an electrical connector 136 connected to the controller 113 via a cable 137. The first motor driver 120 receives a driving signal from the driving commander 115 and rotates the first motor 118.

Figure 4:
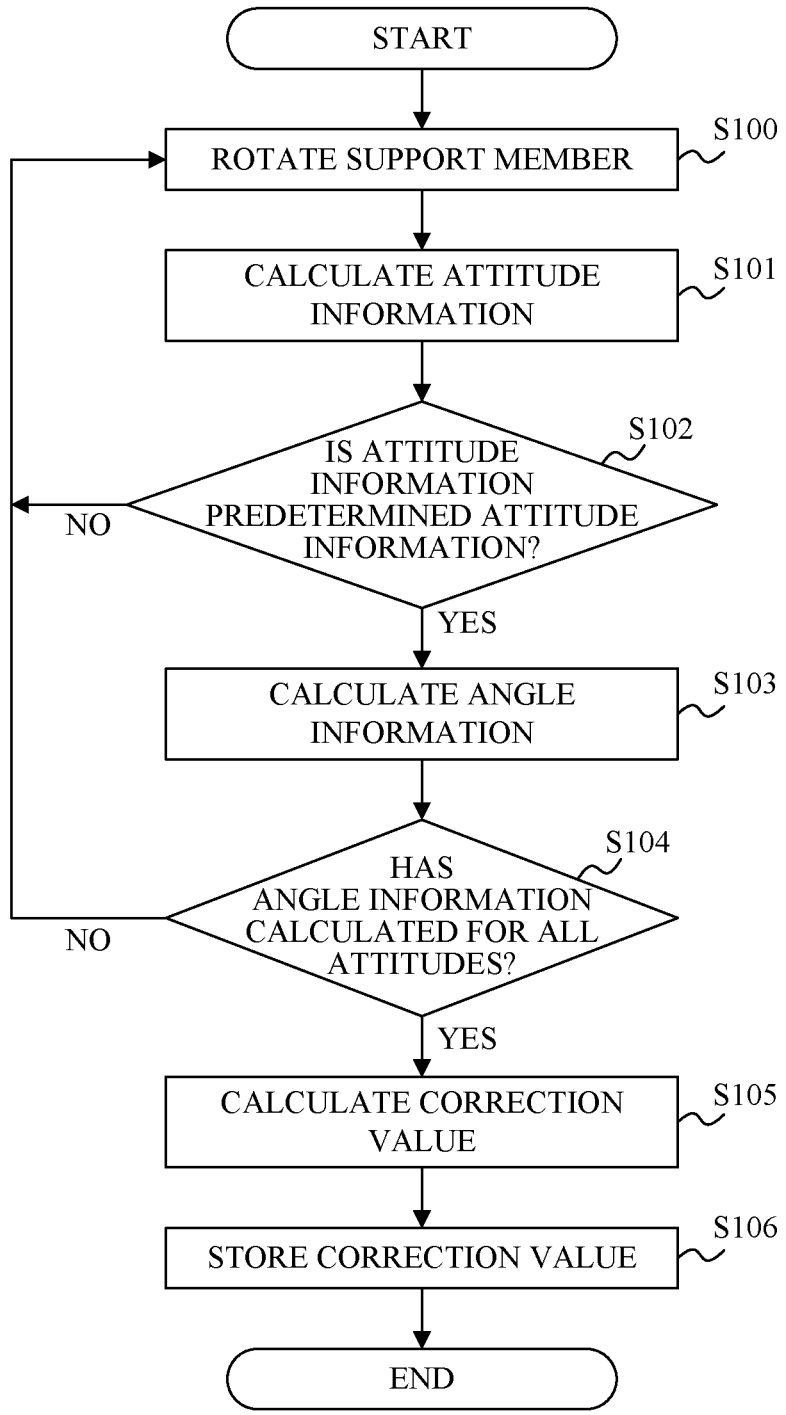
FIG. 4 is a flowchart illustrating a method of calculating a correction value of angle information of a motor according to the first embodiment.

FIG. 4 is a flowchart illustrating a method of calculating the correction value for the angle information of the first to third motors 118, 121, and 124 according to this embodiment. This embodiment will discuss a case of calculating the correction value for the angle information of the first motor 118.

In the step S100, the support member 102 is rotated around the X-axis manually or by the first motor 118. When the support member 102 is rotated around the Z-axis in calculating the correction value for the angle information of the third rotation driver 103, the support member 102 is rotated by 90 degrees around the X-axis or the Y-axis in advance.

In the step S101, the attitude estimator 114 calculates the attitude information $\theta_x$ of the supported unit 101 using the acceleration detected by the second and third acceleration sensors 111 and 112.

In the step S102, the controller 113 determines whether or not the attitude information $\theta_x$ is predetermined attitude information set in advance. If it is determined that the attitude information $\theta_x$ is the predetermined attitude information, the flow proceeds to the step S103, and if not, the flow returns to the step S100.

In the step S103, the signal processor 116 calculates the angle information $\varphi_x$ of the first motor 118 using the rotation angle of the first motor 118 detected by the first angle detecting sensor 119.

In the step S104, the controller 113 determines whether or not the support member 102 has rotated by 360 degrees or more and the calculation of the angle information $\varphi_x$ of the first motor 118 in all predetermined attitudes has been completed. If it is determined that the support member 102 has rotated by 360 degrees or more and the calculation of the angle information $\varphi_x$ of the first motor 118 in all predetermined attitudes has been completed, the flow proceeds to the step S105, and if not, the flow returns to the step S100.

In the step S105, the signal processor 116 calculates the correction value for the angle information $\varphi_x$ of the first motor 118 using the attitude information $\theta_x$ of the supported unit 101 and the angle information $\varphi_x$ of the first motor 118.

In the step S106, the memory 117 stores the correction value for the angle information $\varphi_x$ of the first motor 118.

After the flow of FIG. 4 ends, the correction value stored in the memory 117 is used to correct the angle information of the motor.

Similar processing can calculate the correction value for the angle information of the second and third motors 121 and 124.

As described above, this embodiment calculates the correction value for the angle information of the motor using the attitude information of the supported unit 101 and the angle information of the motor. Using the attitude information to calculate the correction value for the angle informa- tion of the motor can calibrate the angle detecting sensor without connecting a calibration apparatus. By correcting the angle information of the motor, a highly accurate and highly efficient gimbal can be realized. The gimbal according to this embodiment can calculate the correction value for the angle information of the motor even after the assembly.

Second Embodiment

A configuration of a system having a gimbal according to this embodiment is basically the same as that of the first embodiment. This embodiment will describe a configuration different from that according to the first embodiment, and a description of the same configuration as that of to the first embodiment will be omitted.

Figure 5:
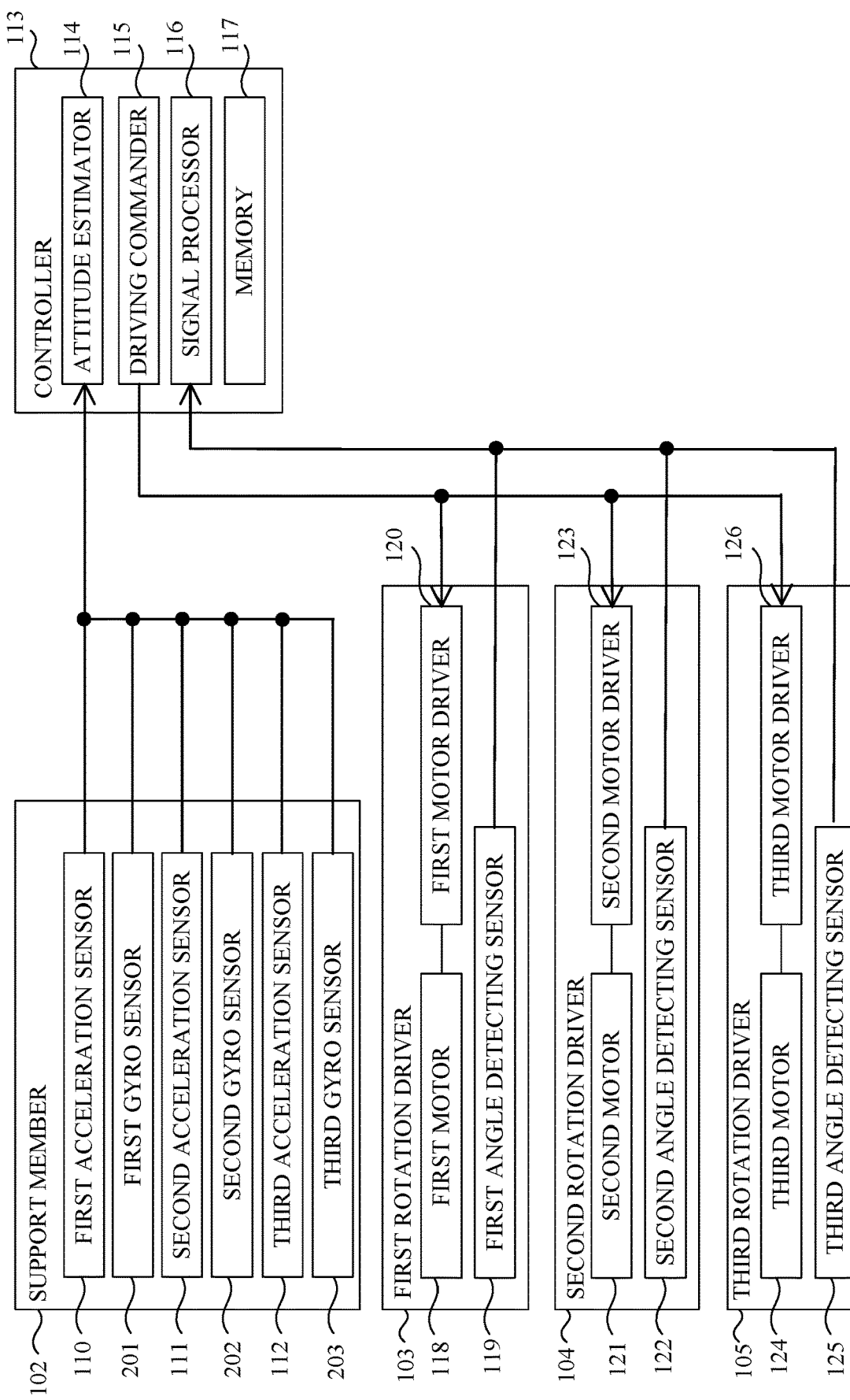
FIG. 5 is a schematic view illustrating a configuration of a gimbal according to a second embodiment.

FIG. 5 is a schematic view illustrating the configuration of the gimbal according to this embodiment. The support member 102 includes a first gyro sensor 201, a second gyro sensor 202, and a third gyro sensor 203 in addition to the first to third acceleration sensors 110, 111, and 112. The first to third gyro sensors 201, 202, and 203 detect angular accelerations of the supported unit 101 around the X-axis, the Y-axis, and the Z-axis, respectively. The first to third gyro sensors 201, 202, 203 output the detected angular accelerations to the controller 113.

The attitude estimator 114 calculates the attitude information ($\theta_x$, $\theta_y$, $\theta_z$) of the supported unit 101 using the accelerations detected by the first to third acceleration sensors 110, 111, and 112 and the angular accelerations detected by the first to third gyro sensors 201, 202, and 203. The attitude information is calculated by performing Madgwick Filter processing for the outputs from the acceleration sensors and the gyro sensors. This embodiment can calculate the attitude information with higher accuracy using the output of the gyro sensors in addition to the outputs of the acceleration sensors.

Figure 6:
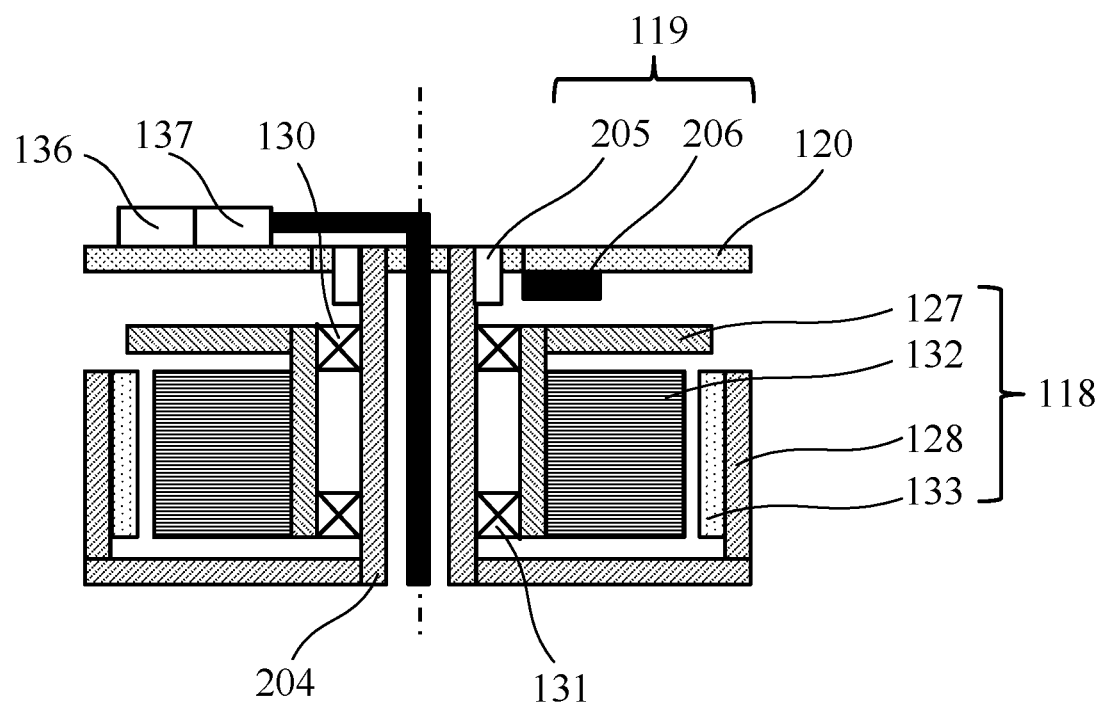
FIG. 6 is a schematic view illustrating a configuration of a first rotation driver according to the second embodiment.

FIG. 6 is a schematic view illustrating the configuration of the first rotation driver 103. Since the configurations of the second and third rotation drivers 104 and 105 are the same as those of the first rotation driver 103, a detailed description of the configurations of the second and third rotation drivers 104 and 105 will be omitted in this embodiment.

The first motor 118 includes a stator member 127, a rotor member 128, a rotating shaft 204, upper bearings 130, and lower bearings 131. The rotating shaft 204 has a hollow structure, and a cable 137 passes through the inside of the rotating shaft 204.

The first angle detecting sensor 119 includes a magnet 205 and a magnetic sensor 206. The magnet 205 has a ring shape and is attached to the end of the rotating shaft 204. The magnetic sensor 206 is located at a position opposite to the magnet 205 in the radial direction of the magnet 205 (the direction orthogonal to the rotation axis of the first motor).

The rotating shaft 204 having a hollow structure and the magnetic sensor 206 located at a position in the radial direction of the magnet 205 can reduce a distance between the first motor driver 120 and the first motor 118, and can make small the first rotation driver 103.

Figure 7:
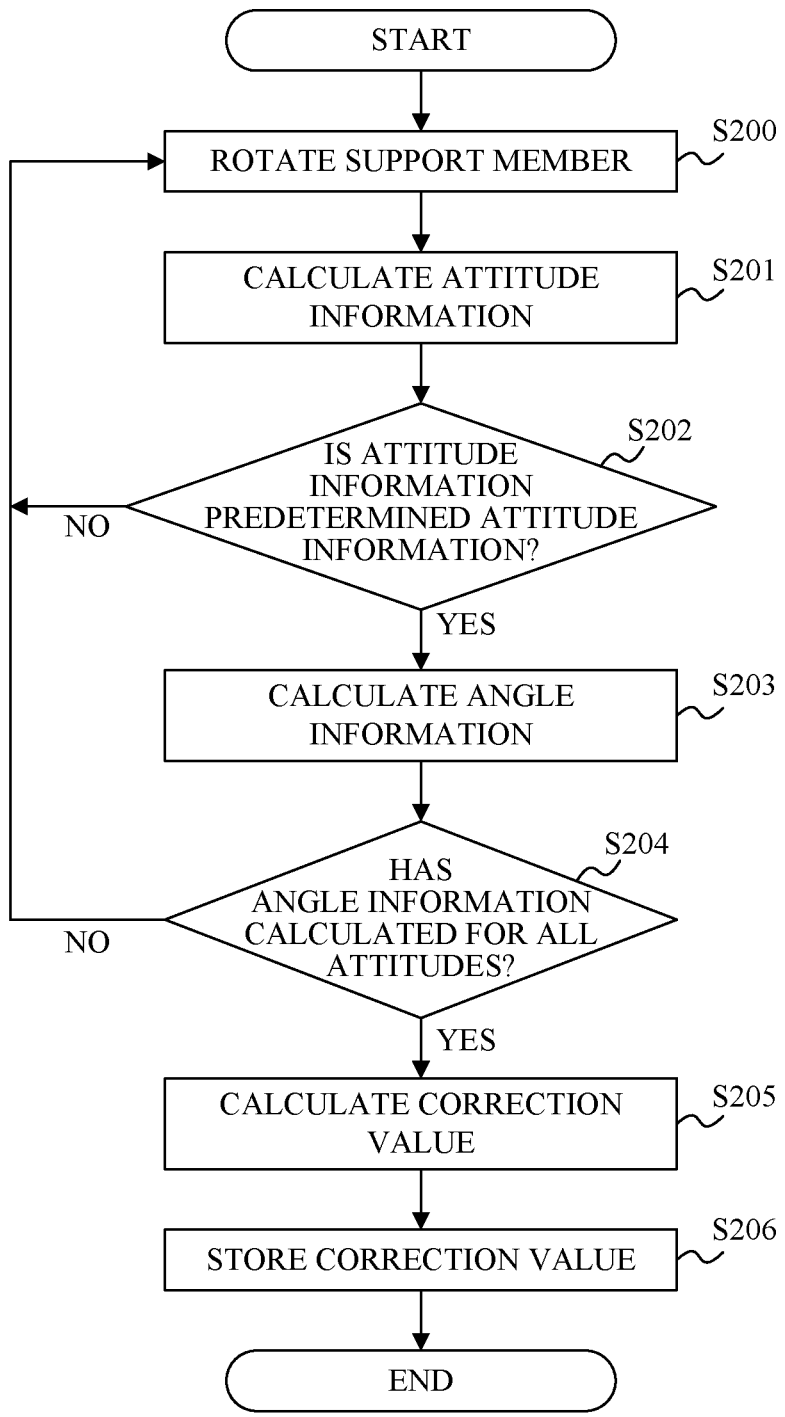
FIG. 7 is a flowchart illustrating a method of calculating a correction value of angle information of a motor according to the second embodiment.

FIG. 7 is a flowchart illustrating a method of calculating correction values for the angle information of the first to third motors 118, 121, and 124 according to this embodiment. This embodiment will discuss a calculation of the correction value for the angle information of the first motor 118.

Since the processing of the step S200 is the same as that of the step S100 in FIG. 4, a detailed description will be omitted.

In the step S201, the attitude estimator 114 calculates the attitude information $\theta_x$ of the supported unit 101 using the acceleration detected by the acceleration sensor and the angular acceleration detected by the gyro sensor.

Since the processing of the steps S202 to S206 are the same as those of the steps S102 to S106 in FIG. 4, a detailed description thereof will be omitted.

Through similar processing, the correction value for the angle information of the second and third motors 121 and 124 can be calculated.

This embodiment calculates the attitude information more accurately than the first embodiment, realizing a more accurate and highly efficient gimbal. This embodiment can make smaller the gimbal by making the configuration of the rotation driver different from that of the first embodiment. The configuration of the angle detecting sensor according to this embodiment needs a calibration of the angle detecting sensor.

Third Embodiment

A configuration of a system having a gimbal according to this embodiment is basically the same as that of the first embodiment. This embodiment will describe a configuration different from that according to the first embodiment, and a description of the same configuration as that of the first embodiment will be omitted.

Figure 8:
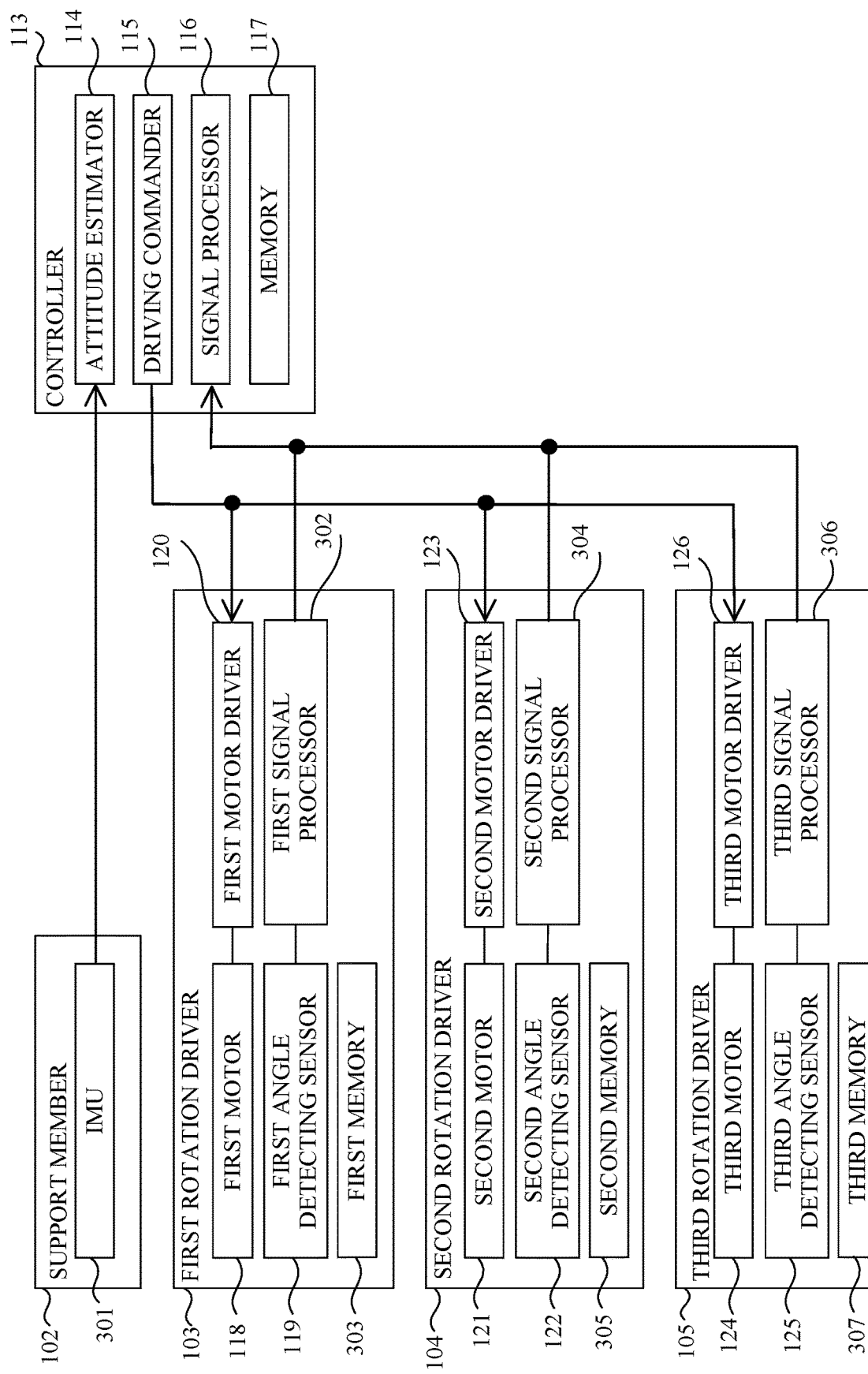
FIG. 8 is a schematic view illustrating a configuration of a gimbal according to a third embodiment.

FIG. 8 is a schematic view illustrating a configuration of a gimbal according to this embodiment. The support member 102 includes an inertial measuring unit (Inertial Measurement Unit: IMU hereinafter) 301. The IMU301 is a device that combines an acceleration sensor, a gyro sensor, and a magnetic sensor.

The attitude estimator 114 calculates the attitude information ($\theta_x$, $\theta_y$, $\theta_z$) of the supported unit 101 using the output of the IMU 301. The attitude information is calculated by performing Madgwick Filter processing for the output of IMU301. This embodiment avoids the influence of the error due to the disturbance using the output of the magnetic sensor, and calculates the attitude information with higher accuracy.

The driving commander 115 calculates a driving amount of the motor so as to stabilize the supported unit 101 in a predetermined attitude using the attitude information of the supported unit 101 calculated by the attitude estimator 114 and the corrected angle information of the motor acquired by the signal processor 116.

The signal processor 116 acquires the corrected angle information ($\varphi'_x$, $\varphi'_y$, $\varphi'_z$) of the motor from the signal processor of each rotation driver.

The memory 117 stores a program to be executed by each of the attitude estimator 114, the driving commander 115, and the signal processor 116.

The first rotation driver 103 includes a first motor 118, a first angle detecting sensor 119, a first motor driver 120, a first signal processor 302, and a first memory 303. The second rotation driver 104 includes a first motor 121, a second angle detecting sensor 122, a second motor driver 123, a second signal processor 304, and a second memory 305. The third rotation driver 105 includes a third motor 124, a third angle detecting sensor 125, a third motor driver 126, a third signal processor 306, and a third memory 307. In this embodiment, the first to third signal processors 302, 304, and 306 serve as the second calculator configured to calculate the correction value for the angle information of the motor.

The first signal processor 302 calculates the angle information $\varphi_x$ of the first motor 118 using the rotation angle of the first motor 118 detected by the first angle detecting sensor 119. The first signal processor 302 calculates a correction value for the angle information of the first motor 118 using the attitude information of the supported unit 101 calculated by the attitude estimator 114 and the angle information of the first motor 118.

The first signal processor 302 corrects the corrected angle information $\varphi_x$ of the first motor 118 using the calculated correction value, and transmits the corrected angle information $\varphi_x$ to the signal processor 116.

In this embodiment, the first to third signal processors 302, 304, and 306 serve as correctors for correcting the angle information, but a corrector may be separate from the first to third signal processors 302, 304, and 306.

The first memory 303 stores the correction value for the angle information of the first motor 118 calculated by the first signal processor 302. The first memory 303 may store a program to be executed by the first motor driver 120 or the first signal processor 302. The correction value and the program are stored in the nonvolatile storage medium in the first memory 303.

Similarly, the second and third signal processors 304 and 306 calculate the corrected angle information $\varphi'_y$ and $\varphi'_z$ of the second and third motors 121 and 124, respectively, and transmit the calculated corrected angle information $\varphi'_y$ and $\varphi'_z$ to the signal processor 116.

Each rotation driver including the signal processor and the memory enables the correction values of the angle information of all the motors to be simultaneously calculated.

Figure 9:
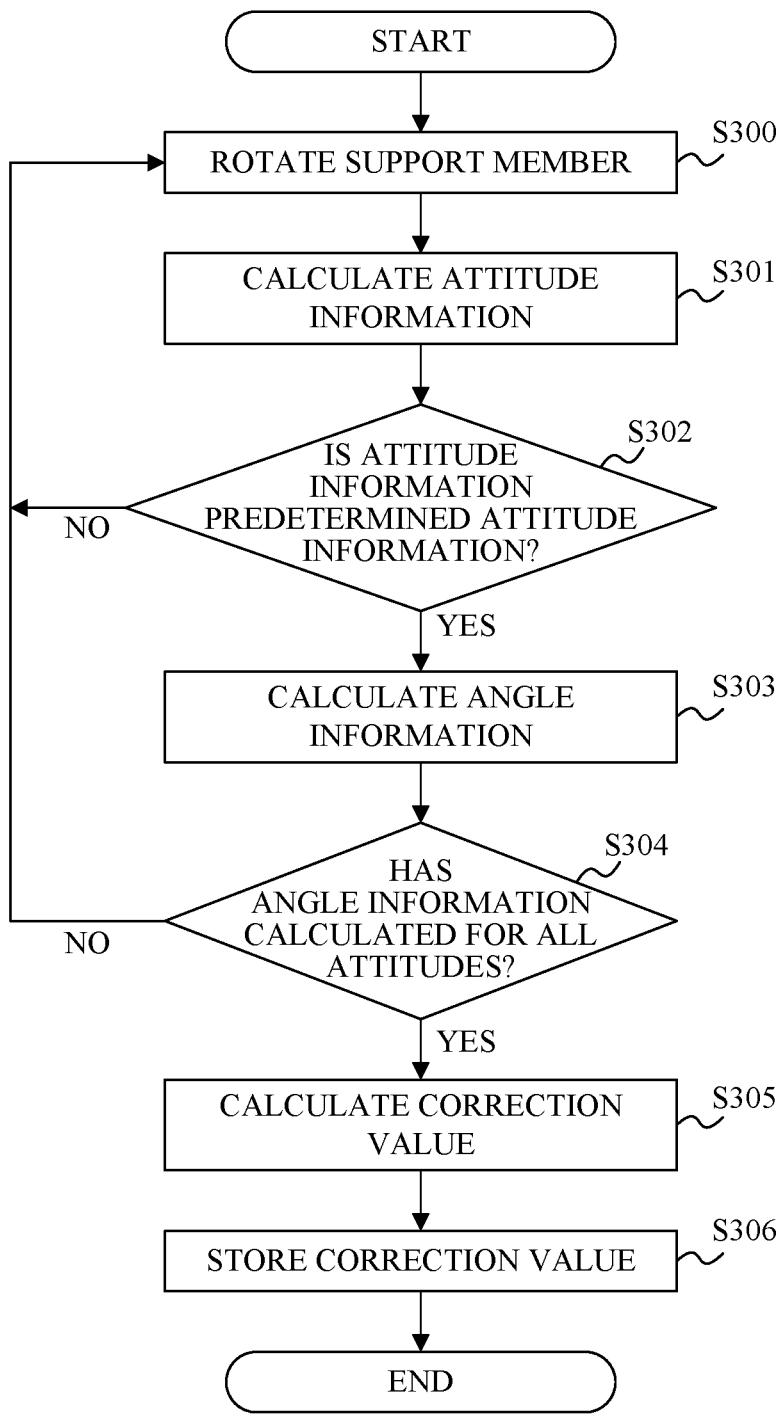
FIG. 9 is a flowchart illustrating a method of calculating a correction value of angle information of a motor according to the third embodiment.

FIG. 9 is a flowchart illustrating a method of calculating a correction value for the angle information of the motor according to this embodiment.

In the step S300, the support member 102 is rotated around the X-axis, the Y-axis, and the Z-axis manually or by the first to third motors 118, 121, and 124.

In the step S301, the attitude estimator 114 calculates the attitude information ($\theta_x$, $\theta_y$, $\theta_z$) of the supported unit 101 using the output of the IMU 301.

In the step S302, the controller 113 determines whether or not the attitude information ($\theta_x$, $\theta_y$, $\theta_z$) is predetermined attitude information set in advance. If it is determined that the attitude information ($\theta_x$, $\theta_y$, $\theta_z$) is the predetermined attitude information, the flow proceeds to the step S303, and if not, the flow returns to the step S300.

In the step S303, the first signal processor 302 calculates the angle information $\theta_x$ of the first motor using the rotation angle of the first motor 118 detected by the first angle detecting sensor 119. The second signal processor 304 calculates the angle information $\varphi_y$ of the second motor 121 using the rotation angle of the second motor 121 detected by the second angle detecting sensor 122. The third signal processor 306 calculates the angle information $\varphi_z$ of the third motor 124 using the rotation angle of the third motor 124 detected by the third angle detecting sensor 125.

In the step S304, the controller 113 determines whether or not the support member 102 has rotated 360 degrees or more around all rotation axes and the calculation of the angle information in all the predetermined attitudes has been completed. If it is determined that the support member 102 has rotated by 360 degrees or more around all the rotation axes and the calculation of the angle information in all the predetermined attitudes has been completed, the flow proceeds to the step S305, and if not, the flow returns to the step S300.

In the step S305, the first signal processor 302 calculates the correction value for the angle information of the first motor 118 using the attitude information of the supported unit 101 and the angle information of the first motor 118. The second signal processor 304 calculates the correction value for the angle information of the second motor 121 using the attitude information of the supported unit 101 and the angle information of the second motor 121. The third signal processor 306 calculates the correction value for the angle information of the third motor 124 using the attitude information of the supported unit 101 and the angle information of the third motor 124.

In the step S306, the first memory 303 stores the correction value for the angle information of the first motor 118. The second memory 305 stores the correction value for the angle information of the second motor 121. The third memory 307 stores the correction value for the angle information of the third motor 124.

The configuration according to this embodiment can calculate the correction values of the angle information of a plurality of motors simultaneously, and shorten the time required for the correction value calculating processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-051616, filed on Mar. 25, 2021, which is hereby incorporated by reference herein in its entirety.

What is claimed is:

1. A gimbal configured to stabilize a supported unit in a predetermined attitude, the gimbal comprising:
   an acceleration sensor configured to detect an acceleration of the supported unit;
   a first calculator configured to calculate attitude information of the supported unit;
   a rotator including a rotor member rotatable relative to a stator member; an angle detecting sensor configured to detect a rotation angle of the rotator;
   a second calculator configured to calculate angle information of the rotator using the rotation angle detected by the angle detecting sensor and to calculate a correction value for the angle information of the rotator using the calculated attitude information of the supported unit and the calculated angle information of the rotator; and
   a gyro sensor configured to detect an angular acceleration of the supported unit,
   wherein the first calculator is configured to calculate the attitude information of the supported unit using the acceleration of the supported unit detected by the acceleration sensor and the angular acceleration of the supported unit detected by the gyro sensor,
   wherein the rotator includes a first rotator and a second rotator,
   wherein the angle detecting sensor includes a first angle detecting sensor configured to detect a first rotation angle of the first rotator, and a second angle detecting sensor configured to detect a second rotation angle of the second rotator,
   wherein the second calculator is configured to calculate first angle information of the first rotator using the first rotation angle detected by the first angle detecting sensor and to calculate second angle information of the second rotator using the second rotation angle detected by the second angle detecting sensor, and
   wherein, in calculating correction values, the second calculator simultaneously calculates (i) a correction value for the first angle information using the calculated attitude information of the supported unit and the calculated first angle information of the first rotator, and (ii) a correction value for the second angle information using the calculated attitude information of the supported unit and the calculated second angle information of the second rotator.

2. The gimbal according to claim 1, wherein the attitude information calculated by the first calculator is information on an angle of the supported unit around a rotation axis of the rotator.

3. The gimbal according to claim 1, further comprising a corrector configured to correct the angle information of the rotator using the correction value for the angle information of the rotator.

4. The gimbal according to claim 1, further comprising a memory configured to store the correction value for the angle information of the rotator.

5. The gimbal according to claim 1, wherein the angle detecting sensor is a magnetic encoder including a magnet fixed to the rotor member.

6. The gimbal according to claim 5, wherein the angle detecting sensor includes a magnetic sensor located at a position opposite to the magnet in a direction orthogonal to a rotation axis of the rotator.

7. The gimbal according to claim 1, further comprising a support member configured to support the supported unit.

8. A system comprising:
   the gimbal according to claim 1; and
   a supported unit supported by the gimbal.

9. The system according to claim 8, wherein the supported unit is an image pickup apparatus.

10. The gimbal according to claim 1,
    wherein the rotator includes a third rotator, the angle detecting sensor includes a third angle detecting sensor configured to detect a third rotation angle of the third rotator, and the second calculator is configured to calculate third angle information of the third rotator using the third rotation angle detected by the third angle detecting sensor, and
    wherein, in calculating correction values, the second calculator simultaneously calculates (i) the correction value for the first angle information, (ii) the correction value for the second angle information, and (iii) a correction value for the third angle information using the calculated attitude information of the supported unit and the calculated third angle information of the third rotator.

* * * * *